(12) United States Patent
Budday et al.

(10) Patent No.: US 12,409,556 B2
(45) Date of Patent: Sep. 9, 2025

(54) PROJECTING SAFETY-RELATED MONITORING FOR A MULTI-AXIS KINEMATIC SYSTEM WITH MULTIPLE MOVABLE SEGMENTS

(71) Applicants: Dominik Budday, Erlangen (DE); Maximilian Walter, Nuremberg (DE)

(72) Inventors: Dominik Budday, Erlangen (DE); Maximilian Walter, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 262 days.

(21) Appl. No.: 18/097,628

(22) Filed: Jan. 17, 2023

(65) Prior Publication Data
US 2023/0226693 A1    Jul. 20, 2023

(30) Foreign Application Priority Data

Jan. 18, 2022   (EP) .................................. 22152022

(51) Int. Cl.
*B25J 9/16* (2006.01)
*B25J 13/08* (2006.01)

(52) U.S. Cl.
CPC ........... *B25J 9/1676* (2013.01); *B25J 9/1666* (2013.01); *B25J 13/089* (2013.01)

(58) Field of Classification Search
CPC ...... B25J 9/1676; B25J 9/1666; B25J 13/089; B25J 9/16; B25J 9/1656; B25J 9/1674;
(Continued)

(56) References Cited

U.S. PATENT DOCUMENTS 8,315,738 B2 * 11/2012 Chang .................... B25J 9/1666
                                                        700/255
2009/0326711 A1    12/2009 Chang et al.
(Continued)

FOREIGN PATENT DOCUMENTS

CN          107414825 A       12/2017
CN          108081267 A        5/2018
(Continued)

OTHER PUBLICATIONS

Duffy, N. D., D. Allan, and J. T. Herd. "Anticollision techniques in multirobot environments." Electronics & communication engineering journal 1.5 (1989): 196-204.
(Continued)

*Primary Examiner* — Kira Nguyen
(74) *Attorney, Agent, or Firm* — Lempia Summerfield Katz LLC

(57) ABSTRACT

A method for projecting safety-related monitoring for a multi-axis kinematic system with multiple movable segments. The method includes assigning multiple respective segment kinematic zones to in each case one or more segments of the multi-axis kinematic system, wherein the respective segment kinematic zones are formed by segment bounding volumes in dependence on the respective segments, providing respective movements of the respective segments in the Cartesian space, ascertaining for each segment spatial elements to be passed through as a result of the respective movements provided, determining for each segment respective overall bounding volumes as respective segment working zones on the basis of the ascertained spatial elements to be passed through, and providing the respective segment working zones for the projecting of a safety function of the safety-related monitoring.

14 Claims, 3 Drawing Sheets

(58) Field of Classification Search
CPC ........... G05B 2219/39098; G05B 2219/40492;
G05B 2219/49137
USPC ........................................................ 700/255
See application file for complete search history.

(56) References Cited

U.S. PATENT DOCUMENTS

| | | | |
|---|---|---|---|
| 2016/0047647 A1* | 2/2016 | Dirschlmayr | G01B 21/00 |
| | | | 702/150 |
| 2016/0345929 A1* | 12/2016 | Azizian | B25J 9/1676 |
| 2017/0000574 A1* | 1/2017 | Itkowitz | A61B 1/0016 |
| 2017/0232614 A1 | 8/2017 | Takeda | |
| 2018/0144459 A1 | 5/2018 | Hamadou et al. | |
| 2021/0138649 A1 | 5/2021 | Baer et al. | |
| 2021/0379762 A1 | 12/2021 | Denenberg et al. | |

FOREIGN PATENT DOCUMENTS

| | | |
|---|---|---|
| CN | 112775962 A | 5/2021 |
| WO | 2017146890 A1 | 8/2017 |

OTHER PUBLICATIONS

Siemens "Simatic Safe Kinematics Getting Started"; Dec. 1, 2018, brXP055932411; URL: a href="https://docplayer.org/112651092-.html;" target="_blank"https://docplayer.org/112651092-.html;/a.

* cited by examiner

PROJECTING SAFETY-RELATED MONITORING FOR A MULTI-AXIS KINEMATIC SYSTEM WITH MULTIPLE MOVABLE SEGMENTS

CROSS REFERENCE TO RELATED APPLICATIONS

This application claims the benefit of EP 22152022.4 filed on Jan. 22, 2022, which is hereby incorporated by reference in its entirety.

FIELD

Embodiments relate to a method for projecting safety-related monitoring for a multi-axis kinematic system with multiple movable segments.

BACKGROUND

Modern, flexible working space monitoring allows the safe and at the same time flexible provision of automated production and handling processes without protective fences. For this, working spaces should be designed in advance as closely as possible to suit the kinematic system used and the surrounding area. A working space is monitored in such a way that component parts of the kinematic system are monitored to check that they do not leave the working space. The modeling of the working spaces for safe monitoring is typically the responsibility of the user, who has to manually establish working zones for movement monitoring. The high complexity of this task usually leads to greatly simplified modeling, with a large, extensive working zone for the entire kinematic system in all possible positions, involving unnecessary and costly use of surface area and volume. Such unnecessarily large working zones have until now been supplemented by a large number of protective zones, which in turn indicate areas within the working zone into which the kinematic system must not encroach.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide refined working space monitoring in a simplified manner.

Embodiments relate to a method for projecting safety-related monitoring for a multi-axis kinematic system with multiple movable segments, including the steps of assigning multiple respective segment kinematic zones to in each case one or more segments of the multi-axis kinematic system, wherein the respective segment kinematic zones are formed by segment bounding volumes in dependence on the respective segments, providing respective movements of the respective segments in the Cartesian space, ascertaining for each segment spatial elements to be passed through as a result of the respective movements provided, determining for each segment respective overall bounding volumes as respective segment working zones on the basis of the ascertained spatial elements to be passed through, and providing the respective segment working zones for the projecting of a safety function of the safety-related monitoring.

When projecting safety-related monitoring, the monitoring of a multi-axis kinematic system is set up and prepared for the later safe operation of the multi-axis kinematic system. The multi-axis kinematic system includes multiple movable segments. For example, multiple axes are provided, each activating a segment. For example, the multi-axis kinematic system is a buckling-arm robot with multiple elements and an end effector, to which a tool is attached. For example, the multi-axis kinematic system is used for relocating goods or machining workpieces or mounting components.

For projecting the safety function, working zones are provided. The safety-related monitoring is based on a computational check of whether parts of the multi-axis kinematic system leave the working zone. In the case of the proposed solution, it is checked whether a respective segment leaves a respective associated segment working zone. Consequently, in the check the individual segments are checked separately, and the individual segments are checked for leaving the respectively associated segment working zone. Consequently, a general working zone is not established, but instead, for the monitoring of each individual segment, it is checked whether the respective individual segment leaves the respectively associated working zone. For this, the associated segment working zone is determined for each segment.

The respective segment working zones consequently define for each segment the space in which the associated segment kinematic zones must be completely located.

The segment working zone is in this case a geometrical body that extends in the Cartesian space over all those spatial areas that the respective segment is intended to cross or pass through in the course of a movement. The segment working zone forms an overall bounding volume over all the spatial elements to be passed through. The spatial elements are for example areas within the Cartesian space in which the multi-axis kinematic system moves into which the relevant segment encroaches at least partially during the movement of the multi-axis kinematic system. The summation of all the spatial elements passed through for each segment forms the basis for the determination of the overall bounding volume that encloses these spatial elements.

The segment working zone may be a zone that is static with regard to its dimensions. It is similarly possible to take into account current speeds or slowing-down paths of the kinematic system and to project the segment working zone variously in its dimensions. The segment working zone may also be fixed with regard to the position and/or orientation for example in a spatially fixed coordinate system and not move along with the kinematic system. Similarly, the pose of the segment working zone may be projected variously over time or be dynamically taken into account in the safe collision monitoring.

The spatial elements to be passed through are determined in such a way that a segment bounding volume is determined for a segment. A segment bounding volume is for example chosen to match the geometry of the segment, for example as a cuboid or as a cylinder or as a sphere. The segment bounding volume completely encloses the respective segment. For example, an axis together with its joints form the basis for the segment bounding volume. The segment bounding volume may be formed as increased in size in all spatial directions in comparison with the segment itself and consequently also includes certain uncertainties in the extent of the kinematic system as a result of measuring inaccuracies or delays.

The segment bounding volume forms for each segment a segment kinematic zone, that moves in the space dependently on the intended movement of the multi-axis kinematic system. In this case, a respective segment kinematic zone passes through different spatial elements. The position and orientation of the segment kinematic zones are consequently dynamic, dependent on the dynamics of the segments. For example, the movement of a respective segment in the space is calculated by a backward transformation when a target trajectory of the end effector of the multi-axis kinematic system is specified. The dimensions of the segment kinematic zones are for example variously projected and take into account current speeds or slowing-down paths of the kinematic system. The size of the segment kinematic zones may consequently depend on the dimensions of the segments and further parameters such as speed or acceleration. These parameters increase the size of the segment kinematic zone, for example, to differing degrees beyond the values required by the dimensions of the segments.

The spatial elements divide the space into multiple, for example identically configured, elements. The spatial elements may divide the complete Cartesian space that may potentially be passed over in the surrounding area of the multi-axis kinematic system. For example, the spatial elements are established in advance. For example, the spatial elements are voxels, that fill the Cartesian space completely and without overlaps.

The proposed segmented modeling of the working space may be far more compact than just one zone for the entire kinematic system allows. This makes it possible to save space. Moreover, a restriction to an explicit specification of an individual trajectory is avoided, and so a more flexible movement of the kinematic system may also be provided. The user may take a single trajectory or combine any number of trajectories and determine the resultant segmented working zones from it or them.

Moreover, not only the path of a tool center point, TCP for short, or of an end effector is considered, but the entire kinematic system, for example with all of the movable segments, and so safety is always ensured on an installation with the multi-axis kinematic system.

The entire bounding volume may be chosen in such a way that it encloses all of the spatial elements to be passed through and at the same time is as small as possible, i.e., declares as little space as possible as the working zone. Consequently, advantageously only a relatively small working space has to be monitored for a segment. Such safety monitoring involves relatively little computational effort. The segment- and movement-specifically created segment working zone is configured especially for the movement of the respective segment. As a consequence, fewer protective zones that restrict the working space have to be set up. The smaller the working zone is, the less likely it is that protective zones have to be additionally specified for a specific application scenario and the fewer protective zones are necessary. This leads to a considerably smaller computational effort.

With each additional protective zone, conventionally each segment must be checked for encroaching into the protective zone. A protective zone less consequently leads to a saving of m checks in the case of m segments. Since, with the proposed method, instead of one large working zone for the multiple segments and multiple protective zones likewise for the multiple segments, advantageously respective working zones are provided for each individual segment, and altogether fewer protective zones for the multiple segments, altogether fewer checks have to be carried out.

The monitoring of working and protective zones with an unnecessarily great number n of protective zones and accompanying sacrifices in performance may be advantageously avoided, since the algorithms for collision checking are of the complexity $O(n^2)$. There is consequently a gain in performance, since the flexible working space modeling often means that fewer protective zones are required. Since conventionally used additional protective zones are to be checked equally for all segments, they increase the computational effort quadratically. Since however there is a unique assignment between segments with an associated segment kinematic zone and associated segmented working zone, this effort is only linear in the case of an additional segment working zone.

Moreover, the checking for leaving a working space causes less computational effort than the checking for overlapping with a protective zone.

For example, the multi-axis kinematic system is operated with the projected safety-related monitoring and checks during ongoing operation the segments for leaving the respective segment-specific segment working zone.

According to one configuration, the respective movements of the respective segments in the Cartesian space are provided by one or more trajectories, that represent a target movement of the multi-axis kinematic system or an actual movement of the multi-axis kinematic system during a real test run under secure conditions. For example, a target movement of the multi-axis kinematic system is indicated by a trajectory of the end effector and from this the positions of the joints and consequently the positions of the individual segments, as seen over the movement sequence, are calculated by a backward transformation. It is determined from the positions or alignments of the segments which spatial elements are passed through by a respective segment bounding volume. Furthermore, multiple trajectories of the end effector may be specified for multiple different movement sequences, that are all to be taken into account for setting up the movement monitoring. Moreover, it is similarly possible to indicate the target movement of the multi-axis kinematic system by trajectories that directly describe the movement of the individual segments. This may be advantageous if the kinematic system for example has to avoid obstacles which are not explicitly bypassed just by specifying the TCP path or as soon as the kinematic system is kinematically underdetermined, i.e., there is no unique assignment of forward and backward transformation, for example when there are >6 DOFs, for example a 6-axis system on a linear rail.

According to one configuration, the respective overall bounding volume is determined by an optimization method in dependence on the ascertained spatial elements to be passed through. The optimization method uses for example an optimization algorithm that minimizes the overall volume of the overall bounding volume. This provides the user with a segmented and optimized model of the required working space that optimally utilizes and covers the space. This optimization has the effect of saving space when providing the working environment for the multi-axis kinematic system and of optimizing the movement monitoring with regard to the required computing power or performance. The saving of space may be utilized, for example, when planning multiple kinematic systems operating alongside one another or with one another, for example by explicit arrangement of the two or more kinematic systems.

The overall bounding volume is configured, for example, as a convex and minimal geometrical body. For example, prescribed geometrical bodies that are optimized in their dimensions in dependence on the spatial elements passed through are used for the overall bounding volume.

According to one configuration, the spatial elements to be passed through are ascertained by a spatial hashing method. Consequently, for each of the intended segment kinematic zones, the three-dimensional space passed through by it is ascertained. The finer the Cartesian space is divided by so-called grid cells in a spatial hashing method, i.e., the smaller the spatial elements are chosen, the more accurately the working zone is adapted to the actually intended movement of the segments or their segment kinematic zones. The method makes it possible even for large amounts of data to efficiently ascertain grid cells that are passed through in a three-dimensional space by a collision calculation algorithm between segment kinematic zones and grid cells.

According to one configuration, the spatial elements to be passed through are ascertained by a topological map or by point clouds or by a voxel map. Consequently, the areas or zones that are to be taken into account for the working zones, and consequently for the working space monitoring, are determined and for example additionally stored. For this, for example, collision calculation methods are used between the segment kinematic zones and the spatial elements. The topological map or the point clouds or the voxel map may also advantageously be displayed, for example in a setting-up or testing phase and may be visualized by a screen.

According to one configuration, the segment bounding volumes are formed by specified geometrical objects, for example by spheres, cuboids, or capsules. For example, the segment bounding volumes are formed dependently on the geometry of the segments and are selected from a specified series of geometrical shapes. For example, a user enters the data of the multi-axis kinematic system with the dimensions of the segments and a setting-up program automatically determines the segment bounding volume dependently on the dimensions and a chosen geometrical object. In this way, the segment kinematic zones are easily and automatically created in a form adapted to the specific multi-axis kinematic system.

According to one configuration, a common overall bounding volume is determined as a common segment working zone for multiple different segments on the basis of the ascertained spatial elements to be passed through of the multiple different segments or their segment kinematic zones. For example, segments may be combined if that produces a common segment working zone that largely corresponds in its dimensions to the superposing of two separate segment working zones or if an area potentially to be omitted from the common segment working zone for example in a production cell cannot be used in some other way. For example, near the base or the foot of a multi-axis kinematic system, segments may be meaningfully combined for the calculation of a common working zone. The combined segments are then in each case checked for leaving the common working zone.

According to one configuration, the respective segment working zone is determined for a fixed time period or a fixed movement phase of a movement sequence of the multi-axis kinematic system. In this way, the segment working zones may be determined variously over time. When considered at different times, for example, first a sphere determined as a segment working zone is used as a first working zone for the working space monitoring in a time period t0 to t1, and a cuboid determined as a segment working zone is activated as a second working zone in a then-following time period t1 to t2. At each point in time or in each time period, each segment kinematic zone is in this case assigned a segment working zone. This allows for an account to be taken of user scenarios in which a kinematic system carries out very different movements and different working zones are to be used in sequence over time, in order in each case to be able to release or use in some other way different spaces within the production cell or machining cell, for example for transfer areas or for access by users.

According to one configuration, the trajectory or the trajectories are assigned braking paths or slowing-down paths and/or the spatial elements to be passed through are ascertained for each segment while additionally taking into account braking paths or slowing-down paths. In this case, the braking or slowing-down paths are for example taken into account in such a way that the segment kinematic zones are extended, in order that the segments do not leave the working zone even in the case of a braking operation and accompanying decelerations. The braking or slowing-down paths are for example determined by a physics simulation or with the aid of error calculation methods. The segment working zone is then determined correspondingly while taking into account the extended segment kinematic zones.

According to one configuration, the respective segment working zones provided for the projecting are activated by the safety function. For example, the segment working zones are determined in the setting-up phase and are subsequently activated in a testing phase and also in the then-following operating phase of the multi-axis kinematic system. In this case, the safety function for example activates the segment working zones for each segment simultaneously as soon as a movement sequence starts or as soon as the kinematic system is in an operating mode or as soon as there is a power supply for the multi-axis kinematic system.

According to one configuration, the respective segment working zones provided for the projecting are activated for each time period or each movement phase by the safety function. For example, different segment working zones are consequently activated for the movement monitoring for all segments or for selected segments over time. The activation of a respective segment working zone is performed by the safety function for example in a time-controlled manner, wherein a time basis of the movement control is used or is performed when triggered by a sensor value providing information about the position or some other aspect, provided by the safe movement control or a safe sensor.

According to one configuration, protective zones that restrict the segment working zones are additionally specified for the projecting of the safety-related monitoring. In this case, for example, protective zones that apply equally to all of the segment working zones are allocated for the Cartesian space. For example, the protective zones define spaces into which the segment kinematic zones must not encroach. For example, the protective zones are permanently activated or at certain time periods or for certain movement phases. A protective zone is, for example, formed by a transfer area into which the kinematic system should not encroach, since a collision with people using the system cannot be ruled out there. For example, protective zones are also specified by areas in the working environment in which switch cabinets or similar devices are located.

Embodiments further provide a setting-up component for projecting safety-related monitoring for a multi-axis kinematic system, including input and operator-control means for assigning multiple respective segment kinematic zones to in each case one or more segments of the multi-axis kinematic system, wherein the respective segment kinematic zones are formed by segment bounding volumes in dependence on the respective segments, and for providing respective movements of the respective segments in the Cartesian space, and also a calculating unit for ascertaining for each segment spatial elements to be passed through as a result of the respective movements provided and for determining for each segment respective overall bounding volumes as respective segment working zones on the basis of the ascertained spatial elements to be passed through, and also output means for providing the respective segment working zones for the projecting of a safety function of the safety-related monitoring.

In this way, the setting-up component provides a user with a comprehensive tool with which safety-relevant movement controls may be set up easily and appropriately for a specific multi-axis kinematic system and its movements in the space. The setting up may be performed in a commissioning or setting-up or testing phase of a safety function of the safety-related monitoring or in a commissioning or setting-up or testing phase of the safety-related movement control as a whole.

For example, the setting-up component is configured as part of a safety component with a safety function block implemented on it. The functions of the setting-up components augment for example the functions of the safety function block.

The input, operator-control, the output, and the calculating unit may be provided and executed in software, hardware, or in a combination of software and hardware. Thus, the steps provided by the setting-up component and for example the calculating unit may be stored as program code on a storage medium, for example a hard disk, CD-ROM or a storage module. The individual instructions of the program code are read out and processed by at least one computing unit, including a processor.

According to one configuration, the output also include a visualizing unit for presenting the segment working zones. For example, the voxels or spatial elements that are passed through are also displayed, and also for example trajectories that are also provided or the segment kinematic zones of the segments.

Embodiments further provide a safety-related control for safely operating a multi-axis kinematic system including a safety function block. The safety function block is projected according to one of the methods described above. For example, the safety function block is projected during the commissioning or setting-up or testing phase, in order to use the segment working zones described above during operation which then follows.

DETAILED DESCRIPTION

In the figures, elements with the same function are provided with the same reference signs, unless stated otherwise.

Figure 1:
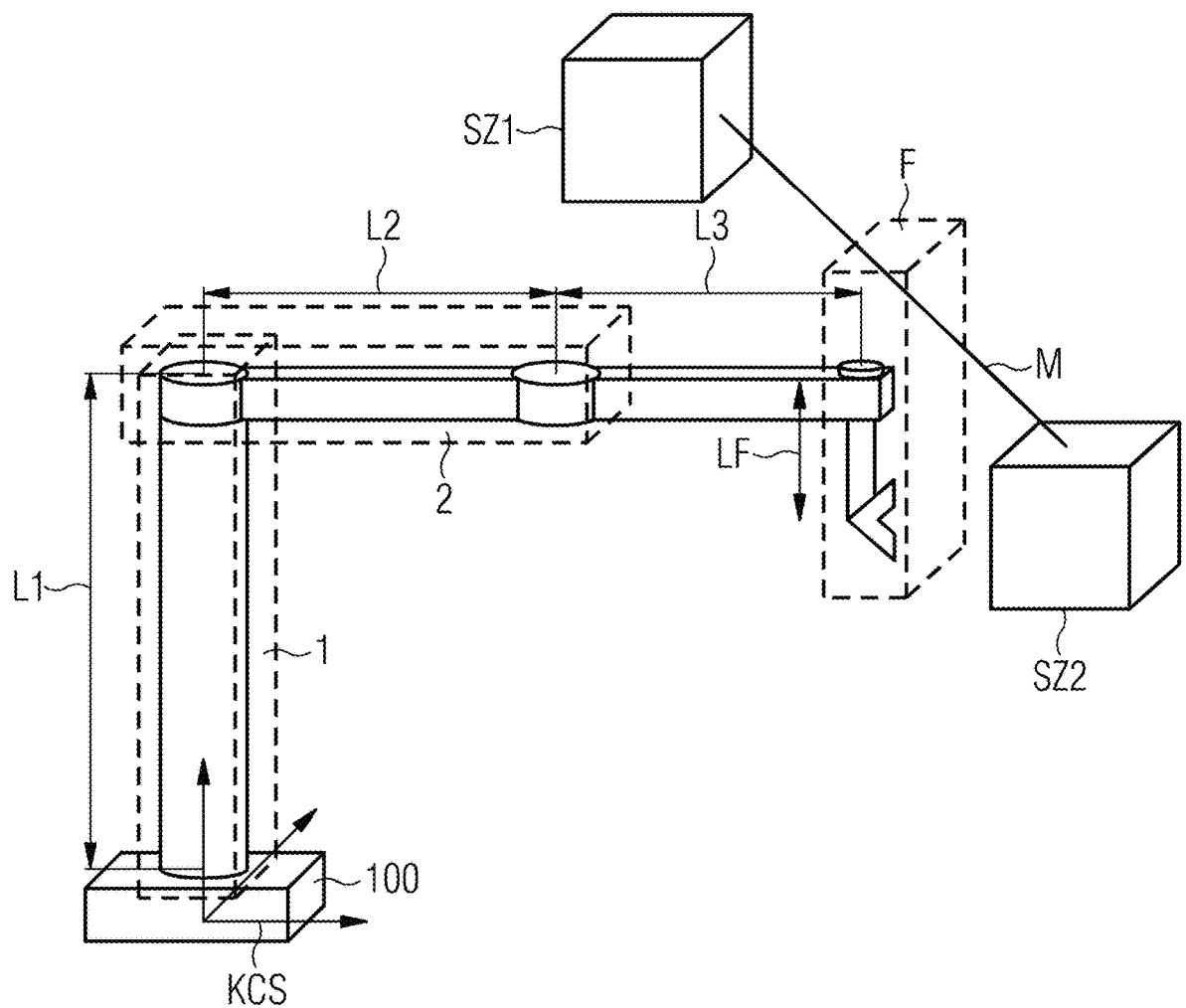
FIG. 1 depicts a schematic representation of a multi-axis kinematic system for illustrating segment kinematic zones according to an embodiment.

Shown in FIG. 1 as a multi-axis kinematic system is a SCARA kinematic system 100, as used in various industrial applications for the mounting of components, handling of components or machining of workpieces. It is for example a SCARA kinematic system 100 with a lifting axis on the flange and geometries as may be seen in FIG. 1. The dimensions for the first segment L1 are L1=500, for the second segment L2 are L2=2000, for the third segment L3 are L3=1000 and for the flange segment LF are LF=200. According to this embodiment, the kinematic system 100 is intended to be used to pick up a glass plate at a transfer location with the aid of a suction gripper on the flange and to transport it to another transfer location.

The user models the SCARA kinematic system 100 in its movement program and its safety program, which is supplemented by a setting-up component for projecting safety-related monitoring of the movement. Here, the associated segment kinematic zones 1, 2, F are also modeled, and so all of the segments relevant to the application scenario are included. In the example, these are the segment L1, the segment L2, the flange segment LF, and also the associated glass plate as the workpiece (glass plate not depicted). In this example the user does not consider additional monitoring to be necessary for the segment L3 because it is clamped between the segment L2 and the flange segment LF and, with the tool center point TCP specified as the point from which the dimensions, position/orientation are described, that is to say the origin of the tool coordinate system, is not freely movable. For example, the values are stored such that they may be retrieved for the segments directly from a CAD program.

The segment kinematic zones 1, 2, F are based for example on cuboids as basic geometrical bodies and are automatically formed on the basis of the figures indicating the dimensions of the segments. In this case, the segment kinematic zones are increased in size in such a way that measuring errors and delay times are taken into account, in order to prevent even in a worst-case scenario that parts of the segments are outside a working zone still to be established or are inside a protective zone likewise still to be established.

Moreover, the user specifies already known protective zones SZ1, SZ2, that are formed by the two transfer locations for picking up and depositing the glass plate. The kinematic system 100 must not encroach into these protective zones SZ1, SZ2, i.e., a stopping operation must be initiated in good time, while taking into account the segment kinematic zones.

The user specifies one or more movements of the kinematic system 100 that it has determined in its movement planning. Here it has established a suitable movement sequence M of a spatial straight line. The workpiece, that is to say the glass plate, is intended here to be aligned aerodynamically parallel to the TCP movement, while fluctuations should be taken into account for the zone dimensioning. The user specifies spheres and cuboids as allowed bounding volumes for the segment kinematic zones.

The entire space of the working cell in which the SCARA kinematic system 100 is located is discretized and divided into small voxels in dependence on the dimensions of the kinematic system and the temporal resolution. In this case, a spatial grid is generated by a spatial hashing method.

Subsequently, a voxel map, that describes the ascertained space separately for each segment kinematic zone during the movement sequence, is created for each relevant segment kinematic zone 1, 2, F. Correspondingly, a voxel map is created for the segment kinematic zone 1 that, as a result of the dynamics of the first segment L1 restricted to rotation about its own axis, corresponds to the voxels already covered in the rest mode. The voxel map for the second segment L2 on the other hand depends on the movement planning for the workpiece, that is obtained in a backward transformation from the specified movement sequence M of the workpiece for the second segment. The swept voxels extend for example in a plane of the second segment L2 in the Cartesian coordinate system KCS to the extent that a deflection of the outer joint of the second segment L2 is necessary.

The voxel map for the flange segment is more complex and dependent on the lifting movement of the flange segment LF on the one hand and the rotating movement at the flange joint on the other hand for the aerodynamic alignment of the glass plate and its subsequent path of movement along the straight line of the intended movement sequence M. The dimensioning of the glass plate itself is also taken into account for the voxel map.

A following optimization step determines for each segment kinematic zone corresponding bounding volumes which enclose the space covered by the voxels completely, but as compactly as possible. Consequently, an optimization algorithm is carried out separately for calculating a first bounding volume for the first segment L1, a second bounding volume for the second segment L2 and a third bounding volume for the flange segment LF. The respective bounding volumes then form segment working zones for each segment, that is to say the area from which a segment or parts of the segment must not protrude in each case, when considered by themselves. In this way, a working space segmented by individual working zones is determined.

As a substep of the optimization, for better run-time performance, individual working space zones may also be further divided and activated at different times, or possibly also brought together. It may for example be determined with how many volumes an optimum design is possible, with a maximum number of zones specified as an input variable. Furthermore, it may be checked how working zones look if a fixed number of zones is specified by the user.

Figure 2:
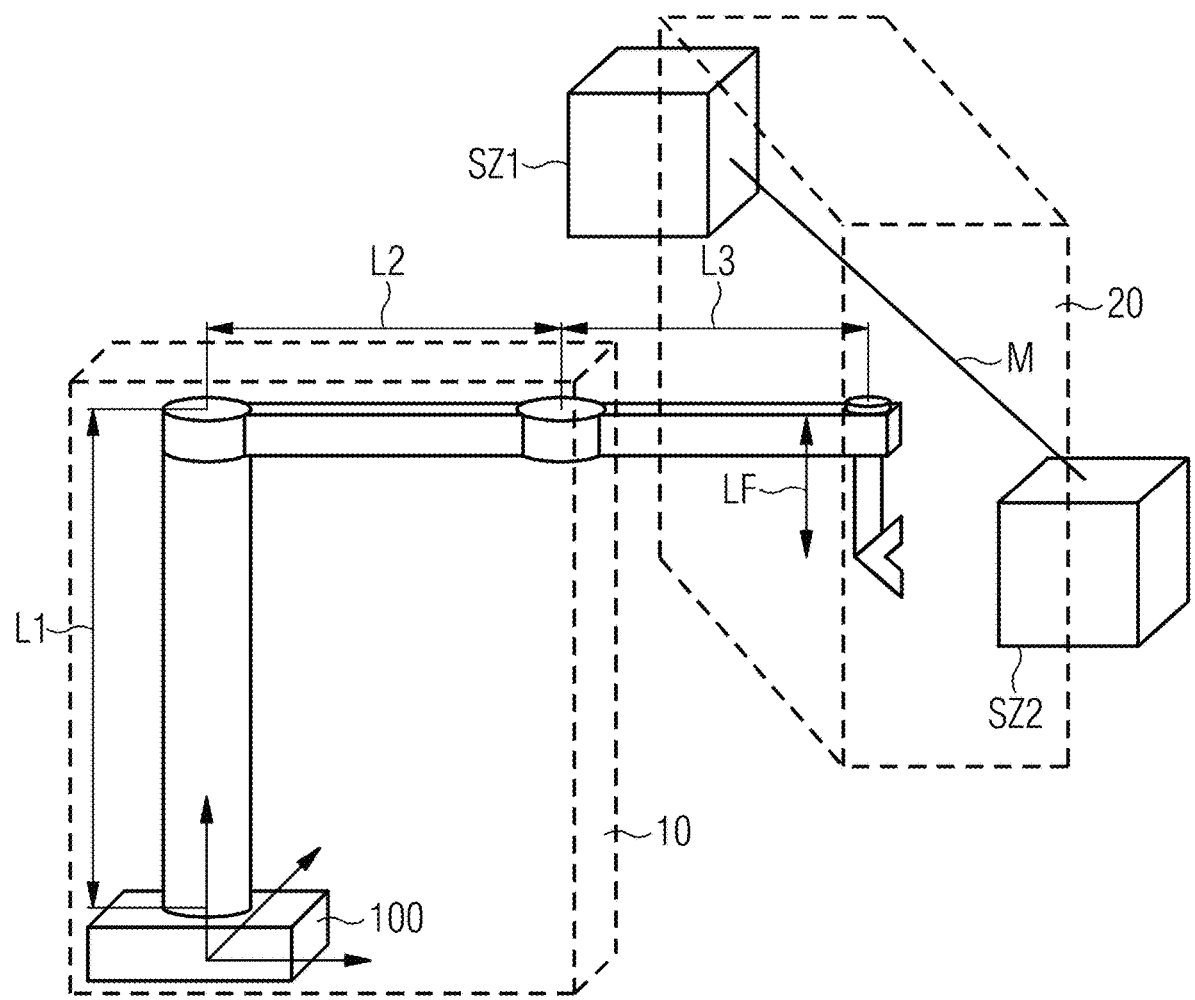
FIG. 2 depicts a schematic representation of a multi-axis kinematic system for illustrating segment working zones according to an embodiment.

The segment working zones are represented in FIG. 2, with the relevant voxels of the two segment kinematic zones 1 and 2 combined for the determination of a common static base working zone 10. The static workpiece working zone 20 is determined on the basis of the voxels crossed as a result of the segment kinematic zones F and the glass plate.

The bounding volumes are indicated by the applicant and serve as respective segment working zones 10, 20 for the associated segment kinematic zones 1, 2, F. They are for example automatically projected in the safety program, and so space-saving and performance-oriented monitoring may be provided.

Compared with manual projection of the working space, it is evident that a great saving of space is possible, in this example of about 30%. For example, in the case of complex working spaces, for example when a multi-axis kinematic system has a particularly large number of degrees of freedom, there is advantageously a great saving, and consequently a great improvement in the performance.

A conventional working zone would have to include the entire space that may be reached by the kinematic system if laborious manual modelings of a single complex working zone are to be avoided. For example, this means in the embodiment that, even with an extended arm, the TCP movement would still have to be performed within the working zone, and so space is unnecessarily taken up, especially in the outermost area, as working space that cannot be reached by the kinematic system.

The proposed solution makes a more compact working zone possible, without having to introduce further protective zones, and consequently loss of performance. The automated calculation shown by way of example, and the segmented modeling of the working space with segment working zones for each dynamic zone counterpart, make this improvement possible.

Figure 3:
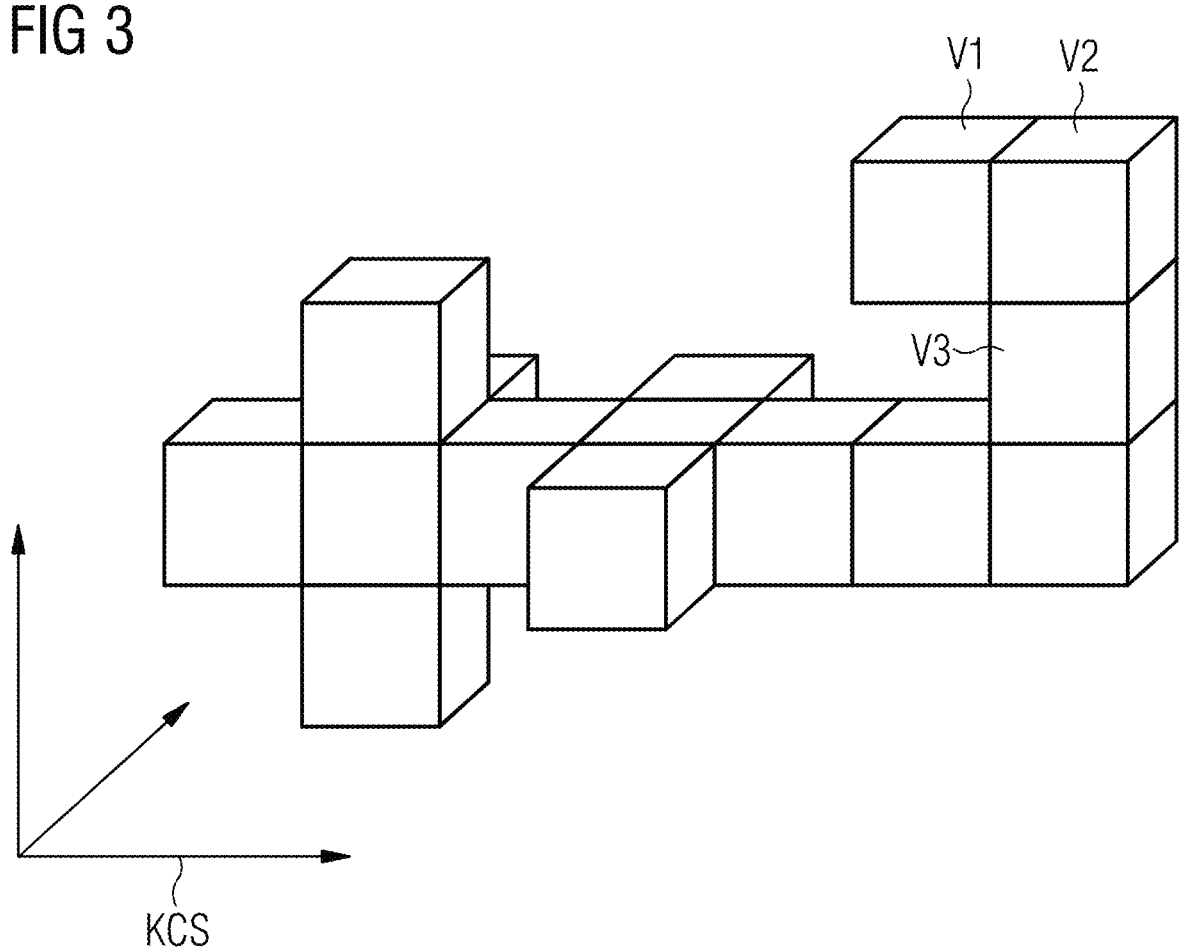
FIG. 3 depicts a schematic representation for illustrating a voxel map according to an embodiment.

In FIG. 3 it is shown how spatial elements V1, V2, V3 etc. that are crossed by an individual segment kinematic zone are determined altogether for a movement of a segment associated with this segment kinematic zone. According to an embodiment, the segment is for example a segment of a buckling-arm robot that is rotatable about multiple axes. The spatial elements V1, V2, V3 etc. may for example be graphically depicted and may be stored together with a respective grid coordinate which is allocated to them in a grid of the Cartesian coordinate system KCS.

Used for example for the determination of an overall bounding volume by way of the determined spatial elements V1, V2, V3 etc. is an optimization algorithm which determines a convex bounding volume in the Cartesian space in such a way that all of the spatial elements V1, V2, V3 etc. are enclosed and at the same time the volume is minimal. Any other specifications may be taken into account in the optimization, for example which basic geometrical bodies are to be used for the overall bounding volume.

For each segment to be monitored in an application scenario, with its segment kinematic zone, the associated spatial elements that are crossed are determined separately, as shown in FIG. 3. For each determined multiplicity of spatial elements, a known optimization algorithm is used in each case for respectively determining an overall bounding volume for respectively establishing a segment working zone.

Although the invention has been illustrated and described in more detail by the exemplary embodiments, the invention is not restricted by the disclosed examples and other variations and combinations may be derived herefrom by a person skilled in the art without departing from the scope of protection of the invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for projecting safety-related monitoring for a multi-axis kinematic system with multiple movable segments, the method comprising:
assigning a plurality of respective segment kinematic zones to one or more segments of the multi-axis kinematic system, wherein the respective segment kinematic zones are formed by segment bounding volumes of each of the one or more respective segments;
providing respective movements of the one or more respective segments in a Cartesian space;

ascertaining segment spatial elements to be passed through as a result of the respective movements provided;

determining a respective overall bounding volumes for each segment comprising respective segment working zones based on the spatial elements to be passed through; and providing the respective segment working zones for the projecting of a safety function of the safety-related monitoring.

2. The method of claim 1, wherein the respective movements of the respective segments in the Cartesian space are provided by one or more trajectories that represent a target movement of the multi-axis kinematic system or an actual movement of the multi-axis kinematic system during a real test run under secure conditions.

3. The method of claim 2, wherein the one or more trajectories are assigned braking paths or slowing-down paths, wherein the spatial elements to be passed through are ascertained for each segment while additionally taking into account the braking paths or the slowing-down paths.

4. The method of claim 1, wherein the respective overall bounding volume is determined by an optimization method based on the ascertained spatial elements to be passed through.

5. The method of claim 1, wherein the spatial elements to be passed through are ascertained by a spatial hashing method.

6. The method of claim 1, wherein the spatial elements to be passed through are ascertained by at least one of a topological map, by point clouds, or by a voxel map.

7. The method of claim 6, wherein the segment bounding volumes are formed by specified geometrical objects.

8. The method of claim 1, further comprising:

determining a common overall bounding volume as a common segment working zone for multiple different segments on the basis of the ascertained spatial elements to be passed through of the multiple different segments.

9. The method of claim 1, wherein the respective segment working zone is determined for a fixed time period or a fixed movement phase of a movement sequence of the multi-axis kinematic system.

10. The method of claim 9, wherein the respective segment working zones provided for the projecting are activated for each time period or each movement phase by the safety function.

11. The method of claim 1, wherein the respective segment working zones provided for the projecting are activated by the safety function.

12. The method of claim 1, wherein protective zones that restrict one or more of the segment working zones are additionally specified for the projecting of the safety-related monitoring.

13. A setting-up component for projecting safety-related monitoring for a multi-axis kinematic system, the setting-up component comprising:

operator-control input configured for assigning a plurality of respective segment kinematic zones to one or more segments of the multi-axis kinematic system, wherein the respective segment kinematic zones are formed by segment bounding volumes in based on the respective segments and for providing respective movements of the respective segments in a Cartesian space;

a processor configured for ascertaining for each segment spatial elements to be passed through as a result of the respective movements provided and for determining for each segment, respective overall bounding volumes as respective segment working zones based on the ascertained spatial elements to be passed through; and an output configured for providing the respective segment working zones for the projecting of a safety function of the safety-related monitoring.

14. The setting-up component of claim 13, wherein the output comprises a visualizing unit for presenting the segment working zones.

* * * * *